(12) United States Patent
Van Erlach

(10) Patent No.: US 11,451,642 B1
(45) Date of Patent: Sep. 20, 2022

(54) ECONTENT AGGREGATION FOR SOCIALIZATION

(71) Applicant: FabFitFun, Inc., Los Angeles, CA (US)

(72) Inventor: Julian Van Erlach, Walnut, CA (US)

(73) Assignee: FABFITFUN, INC., Los Angeles, CA (US)

(*) Notice: Subject to any disclaimer, the term of this patent is extended or adjusted under 35 U.S.C. 154(b) by 0 days.

(21) Appl. No.: 17/645,970

(22) Filed: Dec. 24, 2021

(51) Int. Cl.
  *G06F 15/173* (2006.01)
  *H04L 67/50* (2022.01)
  *H04L 67/306* (2022.01)

(52) U.S. Cl.
  CPC .......... *H04L 67/535* (2022.05); *H04L 67/306* (2013.01)

(58) Field of Classification Search
  CPC .......................... H04L 67/535; H04L 67/306
  USPC ................ 709/224, 203, 204, 206, 227, 231
  See application file for complete search history.

(56) References Cited

U.S. PATENT DOCUMENTS

| | | | |
|---|---|---|---|
| 8,850,006 B2 | 9/2014 | Ashear | |
| 8,874,731 B1 | 10/2014 | Puppin | |
| 9,253,225 B1* | 2/2016 | Junee | H04L 65/403 |
| 9,264,501 B1* | 2/2016 | Story, Jr. | H04L 67/1095 |
| 9,282,149 B2 | 3/2016 | Johnston | |
| 9,503,337 B2 | 11/2016 | Murray et al. | |
| 9,542,379 B1 | 1/2017 | Joshi et al. | |
| 10,356,574 B1* | 7/2019 | Wood | H04W 4/021 |
| 10,628,631 B1 | 4/2020 | Smuda et al. | |
| 10,728,049 B1 | 7/2020 | Goldstein et al. | |
| 10,902,395 B1 | 1/2021 | Knas et al. | |
| 2015/0074533 A1* | 3/2015 | Cafaro | G06F 3/0482 715/719 |
| 2015/0256618 A1 | 9/2015 | Johnston | |
| 2016/0066005 A1* | 3/2016 | Davis | H04N 21/251 725/19 |
| 2016/0259855 A1* | 9/2016 | Jwa | G06Q 30/0277 |
| 2018/0232370 A1* | 8/2018 | Bargagni | G06F 16/438 |

* cited by examiner

*Primary Examiner* — Kaylee J Huang
(74) *Attorney, Agent, or Firm* — Schmeiser, Olsen & Watts, LLP

(57) ABSTRACT

A system, method, and computer program product for content aggregation is provided. The method includes enabling content tracking of each of the plurality of electronic device users for content viewed, streamed and/or stored by the electronic device users on electronic devices, receiving in real time content tracking information and device information, storing the content tracking information and the device information and the user information, aggregating active content stored during the storing across all of the plurality of electronic device users and determining a degree of user-to-user content overlap from the aggregating, and providing an application feature to each of the plurality of electronic device users displaying a number and demographics of other active users engaged with content that is the same as content engaged by each of the plurality of electronic device users.

20 Claims, 10 Drawing Sheets

ECONTENT AGGREGATION FOR SOCIALIZATION

BACKGROUND

The present invention relates generally to systems and methods for content aggregation for the purposes of socialization. More particular, the present invention relates to systems and methods for real-time socialization on a content access application.

Current content delivery applications, such as e-Readers work with your computer or smartphone's internet connection to access one or more digital publication websites. It is known to include chat windows to allow chatting with other user's of the content delivery application. Moreover, it is known to generate forums for discussion based on content being consumed by a user. However, there is no real time content aggregator for providing real time information to users and publishers regarding an aggregation of real-time data on content that is currently being consumed. Moreover, there is no ability for real time suggestions to be made to content consuming users based on this aggregation of data in order to provide a more social experience to content consumption. Thus, the present invention provides advantages over the prior art that, when employed, allows for enhanced real-time socialization for users consuming the same or similar content.

SUMMARY

An embodiment of the present invention relates to a method and associated computer system and computer program product, for content aggregation. The method comprises: receiving, by one or more processors of a computer system, an agreement to opt-in from each of a plurality of electronic device users; receiving, by the one or more processors of a computer system, device information and user information related to the plurality of electronic device users; enabling, by the one or more processors of a computer system using the opt-in feature, content tracking of each of the plurality of electronic device users for content viewed, streamed and/or stored by the electronic device users on electronic devices; receiving, by the one or more processors of the computer system, in real time content tracking information related to the content viewed, streamed and/or stored by the electronic device users on electronic devices, wherein the content tracking information includes content identification and a content component for each of the content viewed, streamed and/or stored for each of the plurality of electronic device users in real time; storing, by the one or more processors of the computer system, the content tracking information and the device information and the user information such that the content tracking information is associated with particular device information and user information from which the content tracking information was received, wherein the storing includes continually updating the content and the content component of each of the content viewed, streamed and/or stored for each of the plurality of electronic device users in real time; aggregating, by the one or more processors of the computer system, active content stored during the storing across all of the plurality of electronic device users and determining a degree of user-to-user content overlap from the aggregating; and based on the aggregating, providing, by the one or more processors of the computer system, an application feature to each of the plurality of electronic device users displaying a number and demographics of other active users of the plurality of electronic device users engaged with content that is the same as content engaged by each of the plurality of electronic device users.

Additionally or alternatively, the method includes parsing, by the one or more processors of the computer system, group level data of the plurality of electronic device users based the device information, the user information, and the content tracking information, and wherein the user information includes location and language information.

Additionally or alternatively, the method includes providing, by the one or more processors of the computer system, a user of the plurality of electronic device users with contact information to allow communication with one or more other users of the plurality of electronic device users based on a degree of common overlap between the user and the other users with previously viewed content.

Additionally or alternatively, the method includes using, by the one or more processors of the computer system, machine learning to suggest groups of users of the plurality of electronic device users based at least in part on a degree of common overlap with previously viewed content.

Additionally or alternatively, the method includes developing, by the one or more processors of the computer system, user profiles of the plurality of electronic device users using machine learning in order to characterize content preferences of the plurality of electronic device users; and using, by the one or more processors of the computer system, the user profiles to suggest for a user of the plurality of electronic device users new content and/or groups of users of the plurality of electronic device users to join.

Additionally or alternatively, the method includes providing, by the one or more processors of the computer system, to a user of the plurality of electronic device users, information displaying current active content engagement by others of the plurality of electronic device users; and allowing, by the one or more processors of the computer system, the user to directly select new content to engage from the information.

Additionally or alternatively, the method includes providing, by the one or more processors of the computer system, to a content publisher or creator, real time engagement information including the content and the content component of each of the content viewed, streamed and/or stored for each of the plurality of electronic device users in real time.

Another embodiment of the present invention relates to a method and associated computer system and computer program product, for content aggregation. The method comprises: responding, by one or more computer processors of a client device, to a request to opt-in to content tracking from a content aggregation server; sending, by the one or more computer processors of the client device, device information and user information related to a content aggregation server; providing, by the one or more processors of the client device, in real time content tracking information related to content viewed, streamed and/or stored by the client device, wherein the content tracking information includes content identification and a content component for each of the content viewed, streamed and/or stored for a user of the client device; receiving, by the one or more processors of the client device, in real time aggregated content tracking information from a plurality of electronic device users; and displaying, by the one or more processors of the client device, in real time a degree of user-to-user content overlap from the aggregated content tracking information with the real time content tracking information for the user of the client device, including displaying a number and demographics of other active users of the plurality of electronic device users engaged with content that is the same as content engaged by the user of the client device.

Advantages of the present invention include increased real-time information related to socialization for a user. Moreover, the present invention advantageously provides content consumers and users with real time data related to content being consumed which can be used for socialization and to find new content. The present invention can advantageously deploy modeling, machine learning or other algorithms to predict content that a user might be interested in, or socialization experiences a user might be interested in, based on real-time content interaction of other users. The present invention advantageously provides enhanced real-time socialization for users consuming the same or similar content.

DETAILED DESCRIPTION

Figure 1:
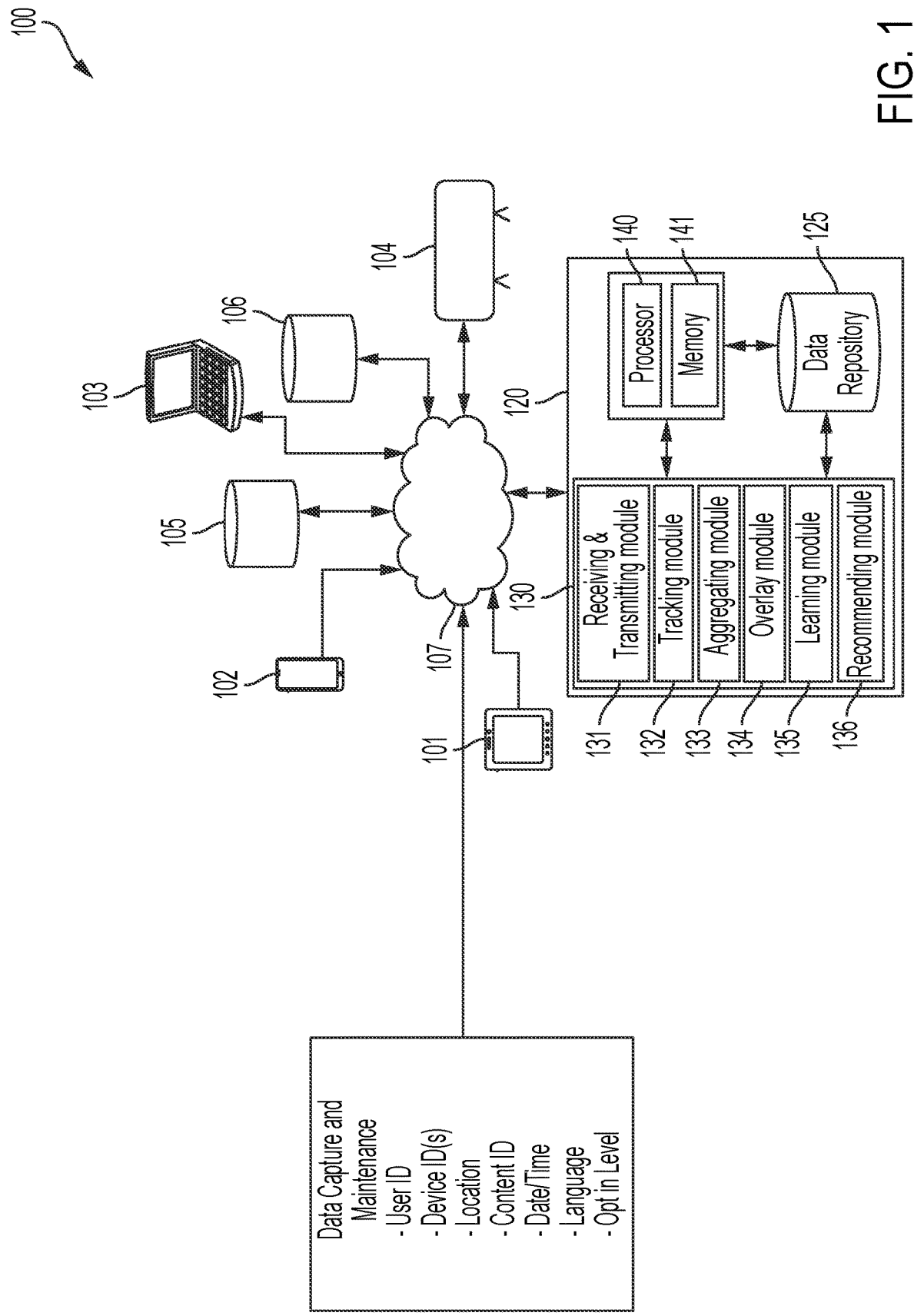
FIG. 1 depicts a system for content aggregation showing a module structure for an application host, in accordance with embodiments of the present invention.

The present invention relates to a method and associated computer system and computer program product, for content aggregation, particularly geared to facilitate socialization as it relates to content consumption. Described herein is an application which may be cloud-hosted. The application facilitates the collection of real time content tracking information obtained from users engaging with content. Embodiments of the application host described herein allows users to opt-in so that a web-connectable electronic device of a user may provide content tracking information to the application host. Content tracked may include any media or content a user has streamed, viewed, read or otherwise engaged with or consumed on the electronic device or other devices associated with the user. The application host described herein is configured to aggregate this received information in real time and identify the content and component of content running or viewed for all opted in users in the system. This aggregation may continually update as new information is received. Based on opted in users, aggregating for active content all users, the application host described herein is configured to determine a real-time degree of overlapping content being engaged with across different users. The application host may include a language translation feature to allow this aggregation and determination to span multiple across multiple content languages. Based on the aggregating, embodiments of the application host provide to a user application running on a user device real-time information related to content consumption of the content the user is currently engaging. The application host may further provide demographic information associated with this overlapping content consumption. Based on determined overlapping content, the application host may further provide real time communication channel opportunities to users, which may include chat groups, subgroups, or active comments. Still further, the present invention may compile the tracked information in order to model the information to make recommendations to users for socialization opportunities. The present invention may further record, archive and statistically or graphicly display content use data aggregated in statistically useful ways. For example, consumption patters for an item of content may be displayed across time, language, location, duration of engagement, etc.

The proposed application, once launched with adequate user permissions, for each user device and/or associated user ID, will track content being consumed, viewed, watched, read, listened to or otherwise engaged with. The application may further track content that the user has searched for. The application may be configured to provide, in a side bar on a user display, information related to the number, nature, location of other users who are viewing the same content. The application may be configured to display overlapping user engagement information at a broad level, such as which book is being read. Additionally or alternatively, the application may be configured to drill down to a more specific level, such as a specific chapter, or page number. The present invention may create a data structure comprising a user ID, a device ID, a content ID, a location and a time; and archive said data structures for future access and cross-reference. These data structures may be continuously written to a data table and updated, and cross-referenced to provide one or more of the referenced functions of the application.

Technology steps associated with the present invention include associating a device identification and/or user identification to content that is currently viewed on a device and reporting this information to an application host or back end server, which may be cloud hosted, for example. The application host compiles and/or aggregates this information across all opted in users and reports to current viewers of content the statistics associated with other viewers of that content based on the data associated with the device and digital content. Language, location, and the like may further be reported. The application host may compile and report this information in real time, and may continually update at periodic intervals.

Thus, in one embodiment where the content is a book read on an e-reader device, the proposed application may allow for a reader to anonymously opt to allow virtual internet tracking of reading activity and/or history of read books. From a user perspective, the application displays in real time how many people are reading the same book, and can show by the same page or chapter where in the world the other readers are, from web-connected devices. This allows real-time discussion and comments on a book being read, a chapter being read, or any aspect of the book or author. This further could allow real-time events for authors to participate in discussion with users. Further, the present application may allow suggested connections based on an overlap of shared read book interests and associated communities by looking across all devices used by users to read e-books.

Still further, the application of the present invention may collect the real-time content information in order to model the information using an algorithm or machine learning techniques. This information may be used to suggest real-time users and/or community groups of users that a given user may be interested in participating in. Moreover, the present invention may further use machine learning to determine user preferences in order to make recommendations of user groups and/or additional content that a user may be interested in.

The present invention thereby provides a real-time internet based graphical user interface (GUI) that links readers of the same book, viewers of the same videos, players of the same video game, or listeners of the same music, viewers of the same web page, on a web-connected device such as an e-book reader or other device and across devices associated with a user, and allows an avatar or direct communication as a group of content consumers. The application tracks each device and what book is active on that device and what chapter or section of the book is on the screen (or what game, music, or video, channel, etc. is active). The application may be configured to build groups based on real-time content information across users, including groups based on content or portions of content (section of a book episode in a video series). The present invention may suggest groups based on a degree of overlapping data when analyzed across entire devices or profiles. Moreover, the present invention may be used by content sources and/or publishers and/or creator to understand real time engagement with content. This may be reported and provided in real time.

FIG. 1 depicts a system for content aggregation 100 showing a module structure 130 for an application host computer system 120, in accordance with embodiments of the present invention. As shown, the system for content aggregation 100 includes a computer system 120, which may be considered a back-end computer system, an application host, or the like. The computer system 120 may be a cloud solution for a software application, for example. The computer system 120 is connected or otherwise communicatively coupled over a network 107 to a plurality of user devices 101, 102, 103, 104, as well as a plurality of content sources 105, 106.

As shown, the user devices 101, 102, 103, 104 may be any type of device usable by a user for the consumption of content or media. For example, the user device 101 may be a tablet device or e-reader device. The user device 102 shown is a mobile communications device or mobile phone. The user device 103 is a laptop computing device, while the user device 104 is a television device. However, the system for content aggregation 100 may include any other type of user devices not shown which may be configured to provide content to a user. A user device may include a display for visual content, or may include speakers for audio content, or a combination thereof. Any form of content receiving device is contemplated having a display and/or speakers, a processor, memory and a networking interface to send and receive information or data.

The content sources 105, 106 may be any content sources for providing content to the user devices 103. The content sources 105, 106 may be data repositories configured to store information which may be provided over the network 107 to the various user devices 101, 102, 103, 104 of the content aggregation system 100. The content sources 105, 106 may include storage of user profiles associated with the respective content sources 105, 106. For example, one content source may be a video streaming source, while another may be a text or image publishing source. Still further, a content source may be a video game content source or a music content source. Some content sources may provide a combination of video streaming, music streaming, text or image publishing and/or video games. The content sources 105, 106 may include their own back end cloud systems and associated front end application software downloadable by a user for rendering the content on the various user devices 101, 102, 103, 104.

The network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

Various types of data may be captured and maintained by the application host computer system 120. This data may be transmitted over the network 107 to the application host computer system 120 from the various devices 101, 102, 103, 104, 105, 106 of the system 100. Examples of data that is captured and maintained by the application host computer system 120 includes user ID data, device ID data, location data, content ID data, date and time data, language data and opt-in level data.

Embodiments of the computer system 120 may include a module structure 130 that includes a receiving and transmitting module 131, a tracking module 132, an aggregating module 133, an overlap module 134, a learning module 135, and a recommending module 136. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines. The modules may each be separate components of the computer system 120. In other embodiments, more than one module may be a single combined computer program, or hardware module. Moreover, the computer system 120 may be a module portion of another computer system server, or computer infrastructure in some embodiments.

Embodiments of the receiving and transmitting module 131 may include one or more components of hardware and/or software program code for obtaining, retrieving, collecting, or otherwise receiving information from the user devices and/or platforms or content sources in the system, as well as transmitting thereto. The receiving and transmitting module 131 may be configured to receive, for example, an agreement to opt-in from each of a plurality of electronic user devices 101, 102, 103, 104 and/or user profiles associated with the devices 101, 102, 103, 104. The receiving and transmitting module 131 may further include receiving device information and user information related to the plurality of electronic device users. The user profiles may be associated with users who sign up and agree to opt-in to the application provided herein. The user profiles associated with the devices 101, 102, 103, 104 may be stored in the data repository 125 and tracking data received by the computer system 120 may be associated with the user profiles, as described below. Further, a user profile may be associated with any number of different devices from which a user may be logged into the application.

Still further, the receiving and transmitting module 131 may be configured to transmit the GUI information to the user devices 101, 102, 103, 104 of the system 100 in order to allow such graphical display of this information to be available to users. The receiving and transmitting module 131 may be configured to provide an application feature to each of the plurality of electronic devices 101, 102, 103, 104, and users thereof, displaying a number and demographics of other active users of the plurality of electronic device users engaged with content that is the same as content engaged by each of the plurality of electronic device users. The various transmitting and receiving of data in this manner to display the demographics of user engagement may occur continually and may be updated in real time. The receiving and transmitting module 131 may be configured to provide to users of the user devices 101, 102, 103, 104 information displaying current active content engagement by others of the plurality of electronic device users.

Likewise, the receiving and transmitting module 131 may be configured to receive communication information across users and transmit such information to appropriate other users, in accordance with the embodiments described herein. The receiving and transmitting module 131 may be configured to provide a user of the plurality of electronic device users with contact information to allow communication with one or more other users of the plurality of electronic device users based on a degree of common overlap between the user and the other users with previously viewed content. For example, such communications may take the form as direct text messaging communications between users, forums or text channels created for groups of users, direct video messaging, or the like.

Still further, the receiving and transmitting module 131 may provide a content publisher or creator, real time engagement information including the content and the content component of each of the content viewed, streamed and/or stored for each of the plurality of electronic device users in real time.

Embodiments of the tracking module 132 may include one or more components of hardware and/or software program code configured for enabling content tracking of each of the plurality of electronic device users for content viewed, streamed and/or stored by the electronic device users on electronic devices. This tracking module 132 may be configured to operate when the receiving and transmitting module 131 has received user opt-in as described above. Further, the tracking module 132 may be in communication with the data repository 125 for storing information associated with identifying content, the content source, content components thereof, associated user information, time information, location information language information or any other data tracked by the tracking module 132. Thus, the tracking module 132 may be configured to store content tracking information and device information and user information such that the content tracking information is associated with particular device information and user information from which the content tracking information was received. This storing may include continually updating the content and the content component of each of the content viewed, streamed and/or stored for each of the plurality of electronic device users in real time.

Embodiments of the aggregating module 133 may include one or more components of hardware and/or software program code configured for aggregating active content stored during the storing by the tracking module 132 across all of the plurality of electronic device users. The aggregating module 133 may compile this data in a manner which can be used by the overlap module 134 and/or learning module 135. The aggregating module 133 may operate in real time and continually aggregate new tracked information received in real time as the information is received in order to provide an accurate idea of real time content viewing by users.

Embodiments of the overlap module 134 may include one or more components of hardware and/or software program code configured for determining an overlap of content viewed across users. Such an overlap may be determined on the basis of a higher level content such as a book, video series or the like. Alternatively, such overlap may be determined on a more specific level of content such as a chapter, page, episode, or level (in the case of game content). The overlap module 134 may further be configured to utilize algorithms to determine aggregate overlap across multiple content sources of a user. For example, an algorithm may determine, by analyzing the whole of a user's content engagement, that the user has a preference for a particular kind of content. Likewise, this determination may be made for another user. The overlap module 134 may be able to determine overlap of general preferences in this manner, across users. The overlap module 134 may be configured to determine both overlapping content, and users with overlapping content interests or real-time content engagement. For example, the overlapping module 134 may be configured to determine that content overlaps with what the user is currently, or has historically engaged with.

Embodiments of the learning module 135 may include one or more components of hardware and/or software program code configured for learning which preferences a user has. For example, it is possible for the overlap module 134 to determine that an overlap exists. However, the user engagement resulting from that determination (i.e. the number of user social interactions based on a determined overlap) may not match expectations. The learning module 135 may be configured to modify those expectations in order so that the overlap module 134 may be capable of making more precise predictions of user preferences and overlap. For example, the overlap module 134 may determine that a user's interests overlap with a particular piece of known content. The recommending module 136 may recommend this overlapping content to the user. The actual engagement with the recommended content may be lower than expected. The learning module 135 may take the tags associated with that recommended content and learn that one particular feature of the recommended content does not overlap with a user's preferences and would actually result in a user not being likely to interested in that content. The learning module 135 may be configured to update the algorithms so that the overlap module 134 becomes more accurate.

Similarly, the overlap module 134 may recommend different forms of communications with users that have overlapping content, as discussed hereinabove. It may be the case that a user has a clear preference for direct communication, rather than community engagement. The learning module 135 may adapt the recommendations provided to the user based on learning that the user is not interested in community interaction, but prefers direct user-to-user interactions. Various forms of machine learning or cognitive analysis may be deployed to ensure that recommendations become more likely to be engaged with by a user.

Embodiments of the recommending module 136 may include one or more components of hardware and/or software program code configured for providing information related to suggestions or recommendations of user groups and content to users based on data analyzed by the computer system 120. The recommending module 136 may be configured to determine these recommendations based on the overlap module, and interface with the receiving and transmitting module 131 to provide recommendations to users. Similarly, the recommending module 136 may interface with the receiving and transmitting module 131 to receive selections from users related to the request to engage new content based on a suggestion or recommendation.

Referring still to FIG. 1, embodiments of the computer system 120 may be equipped with a processor 140 and a memory device 141. The memory device 141 may store the information needed by a processor 140 to perform operations thereof. The processor 140 may be configured for implementing the tasks associated with the computer system 120, described hereinabove. The computer system 120 further includes a data repository 125. The data repository can store information received by the computer system 120 and collected by the receiving and transmitting module 130 related to content tracking, along with information or portions of the software stack(s), including front end layers, server layers, API layers and the like, associated with running the application host solution described herein.

Thus, the application host computer system 120 may be configured to perform a process whereby first the computer system 120 creates a data structure that includes a user ID, device ID, content IDs, user opt-in level, user activity status and the like. The application host computer system 120 may archive and continuously update each of these data structures as new data is received by the device 101, 102, 103, 104, 105, 106 in the system (i.e. by saving this information in the data repository 125). The application host computer system 120 may continuously cross reference the data structures to assure connections are maintained by content ID, active users and the like. The application host computer system 120 may write updated data structures to RAM (i.e. the memory 117) and execute user interface updates based on user commonalities (i.e. overlapping content ID). The application host computer system 120 may store data by user and/or types of aggregation completed and provide this information to the user device so that the user interface of the user device can display this information to the user.

Figure 2:
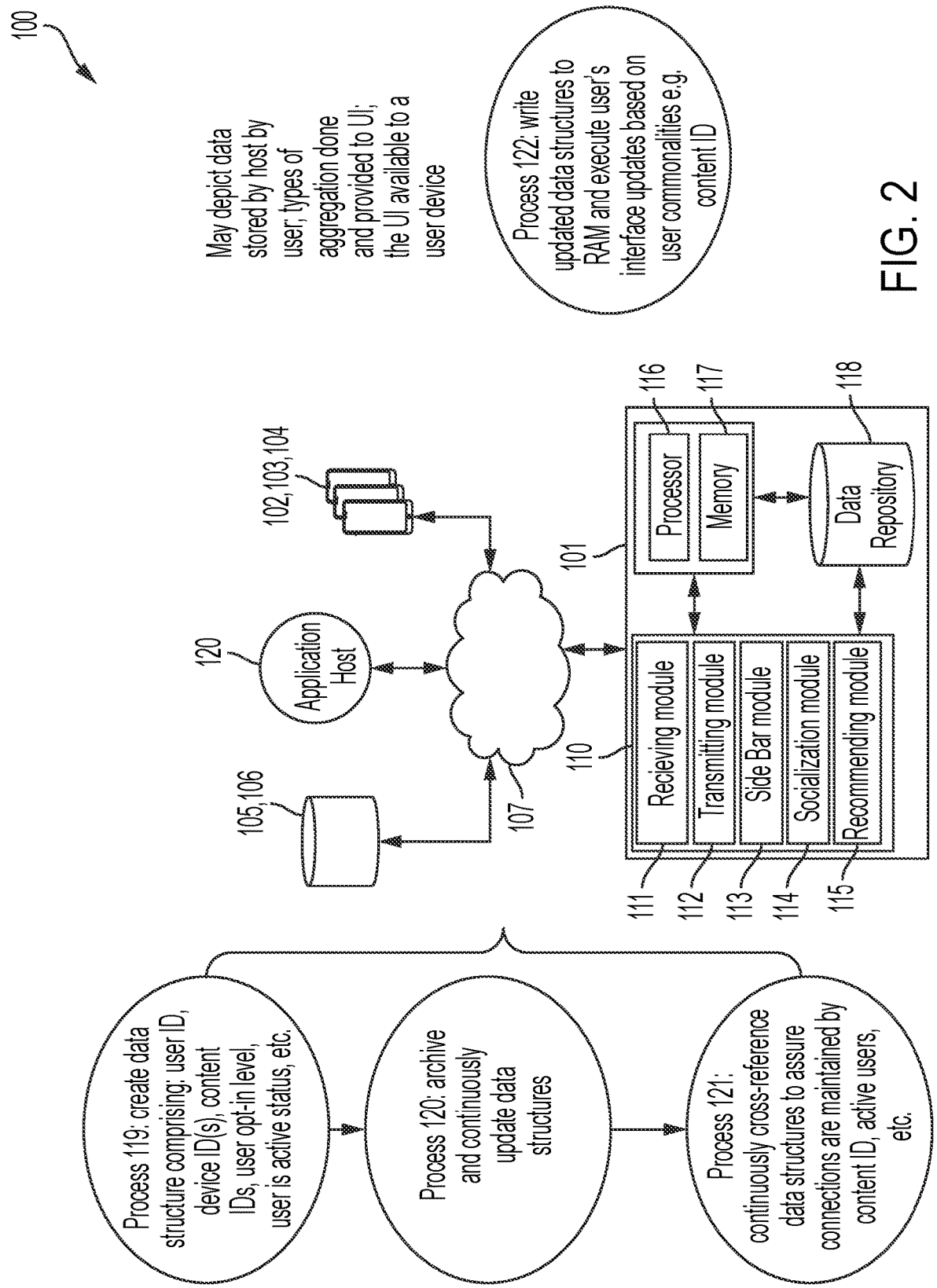
FIG. 2 depicts the system for content aggregation of FIG. 1 showing a module structure for a user device, in accordance with embodiments of the present invention.

FIG. 2 depicts the system for content aggregation 100 of FIG. 1 showing a module structure 110 for a user device, such as the user device 101, in accordance with embodiments of the present invention. As shown, the module structure 110 is shown from the perspective of the user device 101, which is connected over the network 107 to other user devices 102, 103, 104, as well as to the application host 120 (detailed in FIG. 1), as well as the content sources 105, 106. The user device 101 is shown including its own module structure 110 that includes a receiving module 111, a transmitting module 112, a sidebar generation module 113, a socialization module 114, and a recommending module 115. Like the modules described hereinabove, the modules may each be separate components of the user device 101. In other embodiments, more than one module may be a single combined computer program, or hardware module. Moreover, the user device 101 may be a module portion of another computer system server, or computer infrastructure in some embodiments.

Embodiments of the receiving module 111 may include one or more components of hardware and/or software program code configured for receiving and/or transmitting information or data through the network 107 to the various devices and platforms in the system 100. For example, the receiving module 111 may be configured to receive a request to opt-in to content tracking from a content aggregation server, such as the application host computer system 120. The receiving module 111 may be configured to receive in real time aggregated content tracking information from a plurality of electronic device users. Thus, the receiving module 111 may further receive GUI information and/or suggestions or recommendations generated by the application host computer system 120, such as socialization suggestions or new content suggestions.

Embodiments of the transmitting module 112 may include one or more components of hardware and/or software program code configured for transmitting information from the user device to other users of the system 100 and/or to the application host 120. For example, the transmitting module 112 may be configured to respond to a request to opt-in to content tracking from a content aggregation server. The transmitting module 112 may be configured to send device information and user information related to the content aggregation server such as the application host computer system 120. The transmitting module 112 may be configured to further provide in real time content tracking information related to content viewed, streamed and/or stored by the user device to the computer system 120. The content tracking information includes content identification and a content component for each of the content viewed, streamed and/or stored for a user of the user device.

Embodiments of the side bar module 113 may include one or more components of hardware and/or software program code configured for creating the GUI for providing a display of the user device 101 with the overlap information generated by the overlap module 134 of the computer system 120 and received by the receiving module 111 of the user device 101. The GUI may display information such as real time data analytics for the content currently being viewed. This GUI may include a toggle for toggling by higher level content (i.e. book, TV series, content creator, band, video game) or by lower level content (chapter, page, song, video game level or location, etc). The GUI may provide real time information and may further provide individual user names of individuals that are engaging with overlapping content. Thus, the side bar module 113 may be configured to display in real time a degree of user-to-user content overlap from the aggregated content tracking information with the real time content tracking information for the user of the user device, including displaying a number and demographics of other active users of the plurality of electronic device users engaged with content that is the same as content engaged by the user of the user device.

Embodiments of the socialization module 114 may include one or more components of hardware and/or software program code configured for interfacing with the receiving module 111 and the transmitting module 112 to provide socialization experience interface(s) to the user device 101. The socialization module 114 may provide an interface for the user device to engage with other users. For example, if the side bar module 113 displays various users who are currently engaging with the same content as a given user, the socialization module 114 may provide an individual chat window when the user clicks on another user's name. The socialization module 114 may further provide larger group socialization experiences. The information populated in these socialization experiences may routed through the application host computer system 120 and routed thereby. Users may be enabled to form their own groups within the application; which may be groups formed around one or more items of content or type of content.

Embodiments of the recommending module 115 may include one or more components of hardware and/or software program code configured for interfacing with the recommendation module 136 of the computer system 120. The recommendation module 115 may be configured to provide an interface for a user to be provided with recommendations for social experiences or new content in real time. These recommendations may be generated at the application host level by the computer system 120, but may be provided to the individual user device with a recommendation interface which is interactable by the user on the user device.

Referring still to FIG. 2, embodiments of the user device 101 may be equipped with a memory device 117 and a processor 116. The memory device 117 may store the information needed by a processor 116 to perform operations thereof. The processor 116 may be configured for implementing the tasks associated with the computer system 120, described hereinabove. The computer system 120 further includes a data repository 118. The data repository can store information received by the user device 101 and collected by the receiving and transmitting modules 111, 112 related to the tracking application provided by the application host computer system 120, along with information or portions of the software stack(s), including front end layers provided by the application host computer system 120 associated with running the application host solution described herein.

While only one of the user devices 101 is shown in detail, any of the various user devices 102, 103, 104 shown, described, and contemplated herein may include a module structure such as the module structure 110.

Figure 3:
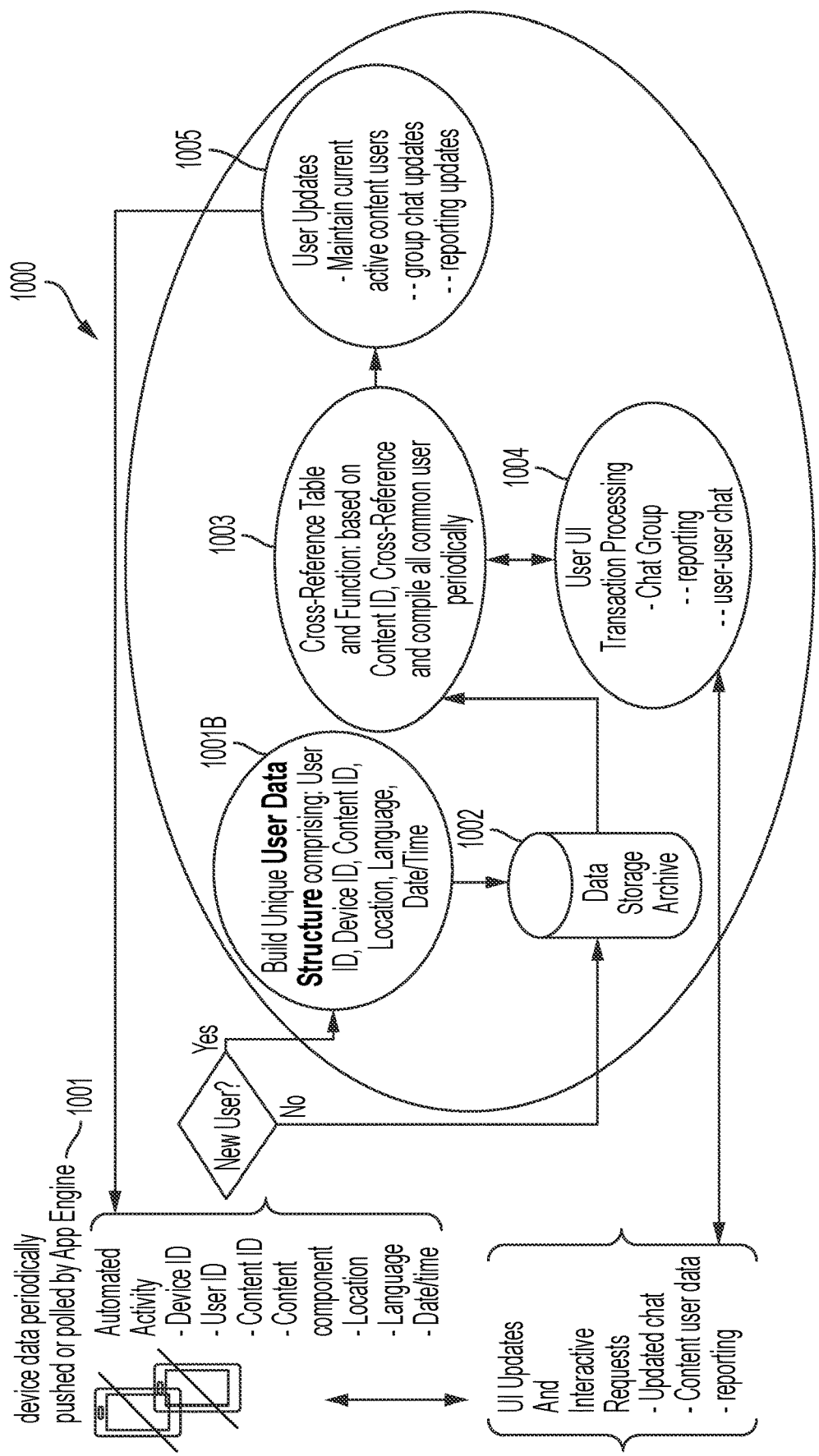
FIG. 3 depicts a functional overview of the system for content aggregation 100 of FIGS. 1 and 2, in accordance with embodiments of the present invention.

FIG. 3 depicts a functional overview of the data flow in the system for content aggregation 100 of FIGS. 1 and 2, in accordance with embodiments of the present invention. The functional overview includes an application engine 1000, such as the module structure 130 of the application host computer system 120. The functional overview shows device data 1001 which may be periodically pushed or polled by the application engine 1000. This transfer of the device data 1001 information may be an automated activity. The device data 1001 may include device ID, user ID, content ID, content component information, location, language, and data/time information.

As shown in the functional overview, when receiving the device data 1001, the application engine 1000 first determines whether the data, query, or other request comes from a new user. If the device data 1001 comes from a new user, the application engine performs a step 1001B of building a unique user data structure that includes a user ID, one or more device IDs, content ID, location, language, time and date in the data structure storage and provides this data structure to a data structure storage archive 1002 (such as the data repository 125 of FIG. 1). If the application engine 1000 first determines that the device data 1001 comes from an existing user, step 1001B may be skipped, and the data may be provided directly to the data storage archive 1002.

Next, the application engine 1000 may include a cross reference table and function 1003, which may be configured to cross reference data across various users based on Content ID. The cross reference table and function 1003 may be configured to cross reference and compile this data across users and compile all common users periodically, according to a predetermined commonality (or upon user input settings). The application engine 1000 may include a user UI transaction processor function 1004. This function 1004 may create chat groups, reporting and user to user chat. Further, the application engine 1000 may include a user updates function 1005 to maintain current active content users, group chat updates and reporting updates.

Figure 4:
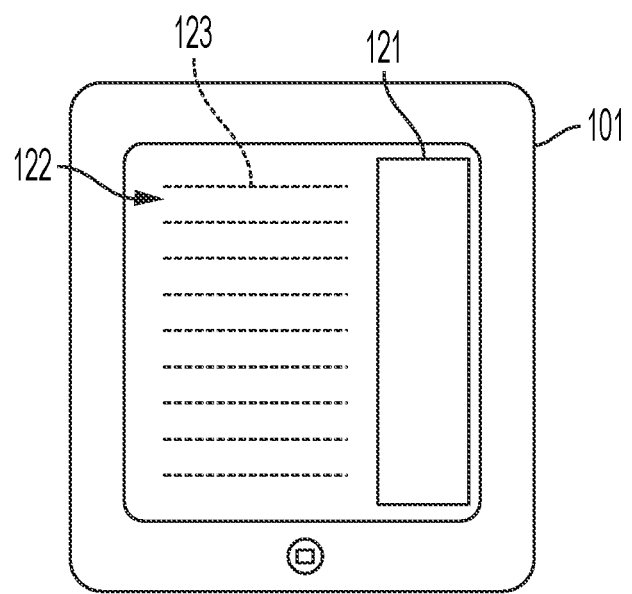
FIG. 4 depicts a user interface for a user device, depicting an exemplary output display of the system for content aggregation of FIGS. 1 and 2, in accordance with embodiments of the present invention.

FIG. 4 depicts a user interface 121 for the user device 101, depicting an exemplary output display of the system for content aggregation of FIGS. 1 and 2, in accordance with embodiments of the present invention. As shown, the user device 101 is a tablet device that includes a display or screen 122. On the display or screen 122 is a content application which is currently displaying text content 123, such as a page of a book. The user interface 121 is shown as a side bar which is located directly next to the content 123 being displayed. The user interface 121 may provide the information to the user that is created by the application host computer system 120 including socialization features and information on overlapping readers, as well as the suggestions and/or recommendations created by the application host computer system 120.

Figure 5:
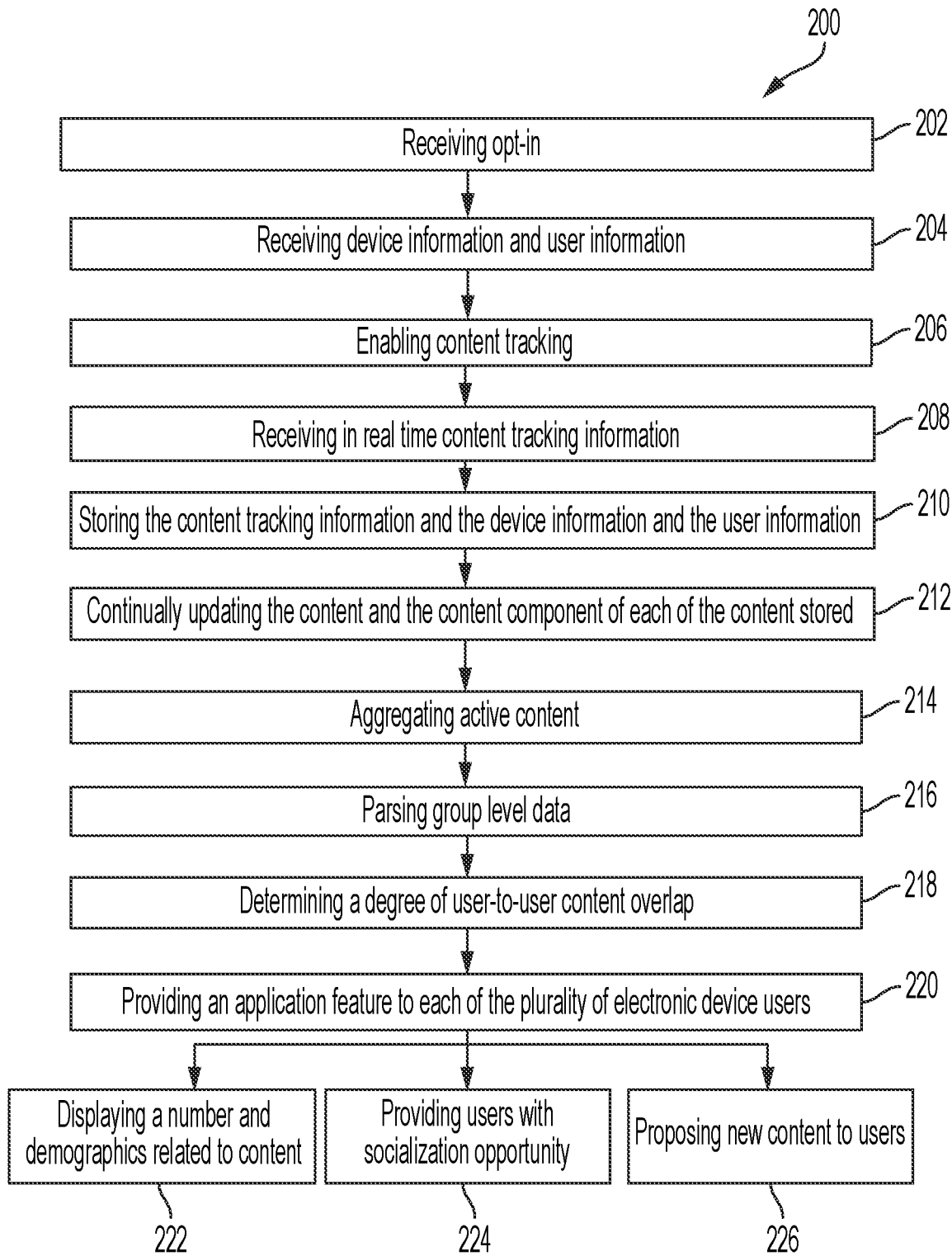
FIG. 5 depicts a method for content aggregation, in accordance with embodiments of the present invention.

FIG. 5 depicts a method 200 for content aggregation, in accordance with embodiments of the present invention. The method includes a first step 202 of receiving, by for example one or more processors of a computer system such as the processor 140 of the computer system 120, an agreement to opt-in from each of a plurality of electronic device users, such as the user devices 101, 102, 103, 104, and/or the associated users or user profiles thereof. The method 200 includes a next step 204 of receiving, by the one or more processors of the computer system, device information and user information related to the plurality of electronic device users. The method 200 then includes a step 206 of enabling, by the one or more processors of a computer system using the opt-in feature, content tracking of each of the plurality of electronic device users for content viewed, streamed and/or stored by the electronic device users on electronic devices. Next, the method 200 includes a step 208 of receiving, by the one or more processors of the computer system, in real time content tracking information related to the content viewed, streamed and/or stored by the electronic device users on electronic devices. The content tracking information includes content identification and a content component for each of the content viewed, streamed and/or stored for each of the plurality of electronic device users in real time. The method 200 includes a step 210 of creating and storing a data structure associated with a user by the one or more processors of the computer system, the content tracking information and the device information and the user information such that the content tracking information is associated with particular device information and user information from which the content tracking information was received. The storing may include an additional step 212 of continually updating the content and the content component of each of the content viewed, streamed and/or stored for each of the plurality of electronic device users in real time.

The method 200 then includes a step 214 of aggregating, by the one or more processors of the computer system, active content stored during the storing across all of the plurality of electronic device users. The method 200 may include a step 216 of parsing, by the one or more processors of the computer system, group level data of the plurality of electronic device users based the device information, the user information, and the content tracking information. This parsing may include analyzing the user information includes location and language information. The method 200 may further include a step 218 of determining a degree of user-to-user content overlap from the aggregating.

Based on the aggregating and/or the determining, the method 200 may then include a step 220 of providing, by the one or more processors of the computer system, an application feature to each of the plurality of electronic device users. The method 200 may include a step 222 of displaying, by the application feature of step 220, a number and demographics of other active users of the plurality of electronic device users engaged with content that is the same as content engaged by each of the plurality of electronic device users. For example, the method 200 may include providing, by the one or more processors of the computer system, to a content publisher or creator, real time engagement information including the content and the content component of each of the content viewed, streamed and/or stored for each of the plurality of electronic device users in real time.

Likewise, the method 200 may include a step of 224 of providing, by the application feature of step 220, users with socialization opportunities. For example, the method may include providing, by the one or more processors of the computer system, a user of the plurality of electronic device users with contact information to allow communication with one or more other users of the plurality of electronic device users based on a degree of common overlap between the user and the other users with previously viewed content.

Similarly, the method 200 may include a step 226 of proposing, by the application feature of step 220, new content to users. For example, the method 200 may include developing, by the one or more processors of the computer system, user profiles of the plurality of electronic device users using machine learning in order to characterize content preferences of the plurality of electronic device users. The method 200 may include using, by the one or more processors of the computer system, the user profiles to suggest for a user of the plurality of electronic device users new content and/or groups of users of the plurality of electronic device users to join. Likewise, the method may include providing, by the one or more processors of the computer system, to a user of the plurality of electronic device users, information displaying current active content engagement by others of the plurality of electronic device users, and allowing, by the one or more processors of the computer system, the user to directly select new content to engage from the information. The method may include further steps enabling a ranking of user comments or users based on the degree or relative number of "likes" or similar means of relative rankings of users and comments by other users.

Figure 6:
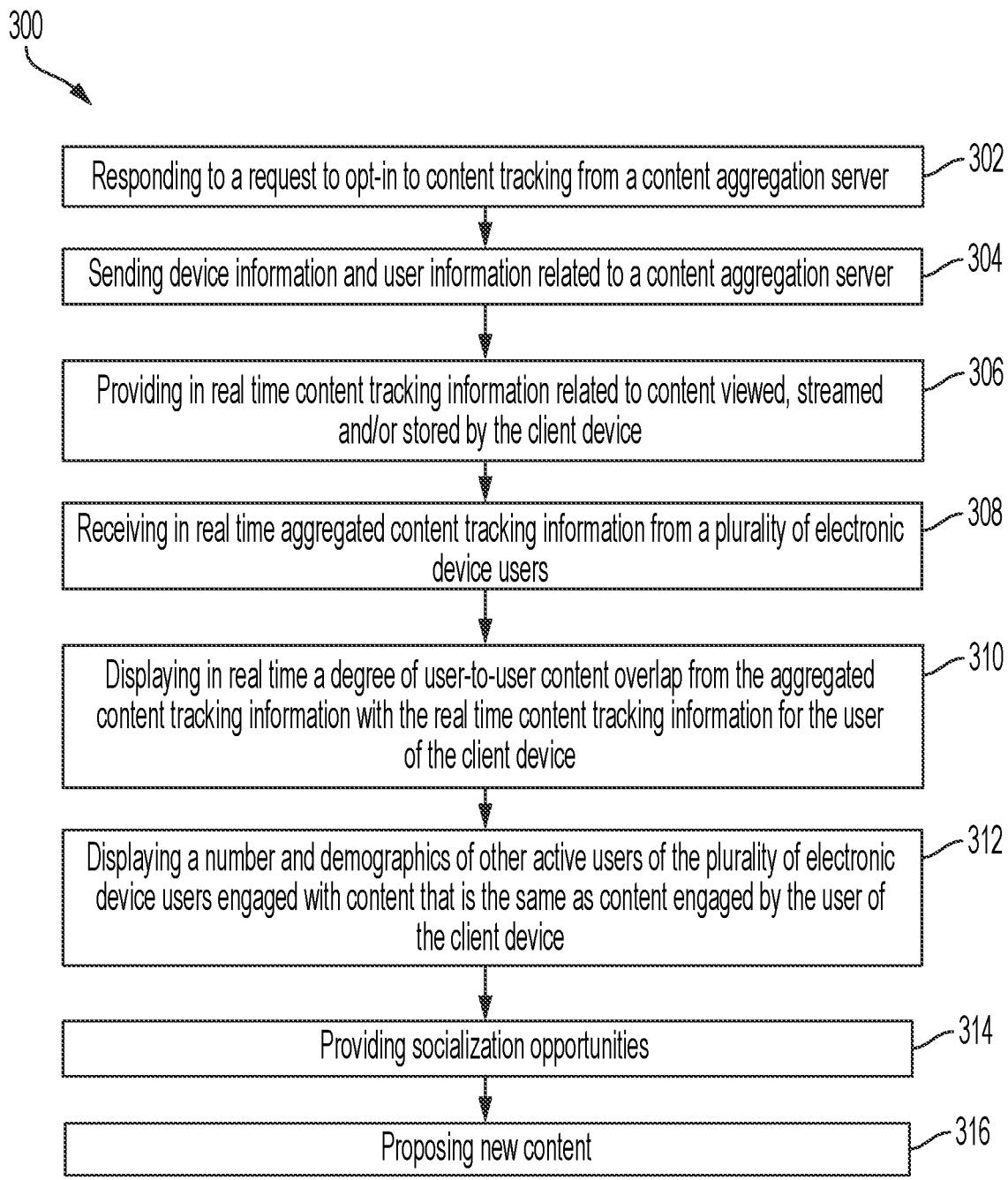
FIG. 6 depicts another method for content aggregation, in accordance with embodiments of the present invention.

FIG. 6 depicts another method 300 for content aggregation, in accordance with embodiments of the present invention. The method 300 may include a first step 302 of responding, by one or more processors of a user device, such as the processor 116 of the user device 101, to a request to opt-in opt-in to content tracking from a content aggregation server, such as the computer system 120. The method 300 may include a step 304 of sending, by the one or more computer processors of the user device, device information and user information related to a content aggregation server. The method 300 may include providing, by the one or more processors of the user device, in real time content tracking information related to content viewed, streamed and/or stored by the user device. The content tracking information may include content identification and a content component for each of the content viewed, streamed and/or stored for a user of the user device. The method 300 may include receiving, by the one or more processors of the user device, in real time aggregated content tracking information from a plurality of electronic device users. The method 300 may include displaying, by the one or more processors of the user device, in real time a degree of user-to-user content overlap from the aggregated content tracking information with the real time content tracking information for the user of the user device, including displaying a number and demographics of other active users of the plurality of electronic device users engaged with content that is the same as content engaged by the user of the user device. The method 300 may include a step 314 of providing, by the one or more processors of the user device, socialization opportunities to interact with other users such as those described hereinabove, via an application of the user device. The method 300 may include a step 316 of proposing, by the one or more processors of the computer system, new content to the user which the new user can interact with, where the new content is determined according to the methodology provided herein. The application may track measures of user engagement with one or more types of content, by, for example, which open content the user is presently viewing, and how often the user is interacting with the content via speech or touch of the UI that is manipulating the content. Users may be enabled to block other users from appearing on their UI. Degrees of opt-in tracking may be offered, such as opting in for some tracking, but not all tracking (i.e. selective tracking), opting in or out of socialization features (i.e. allowing or disallowing other users to contact a given user), or the like.

Figure 7:
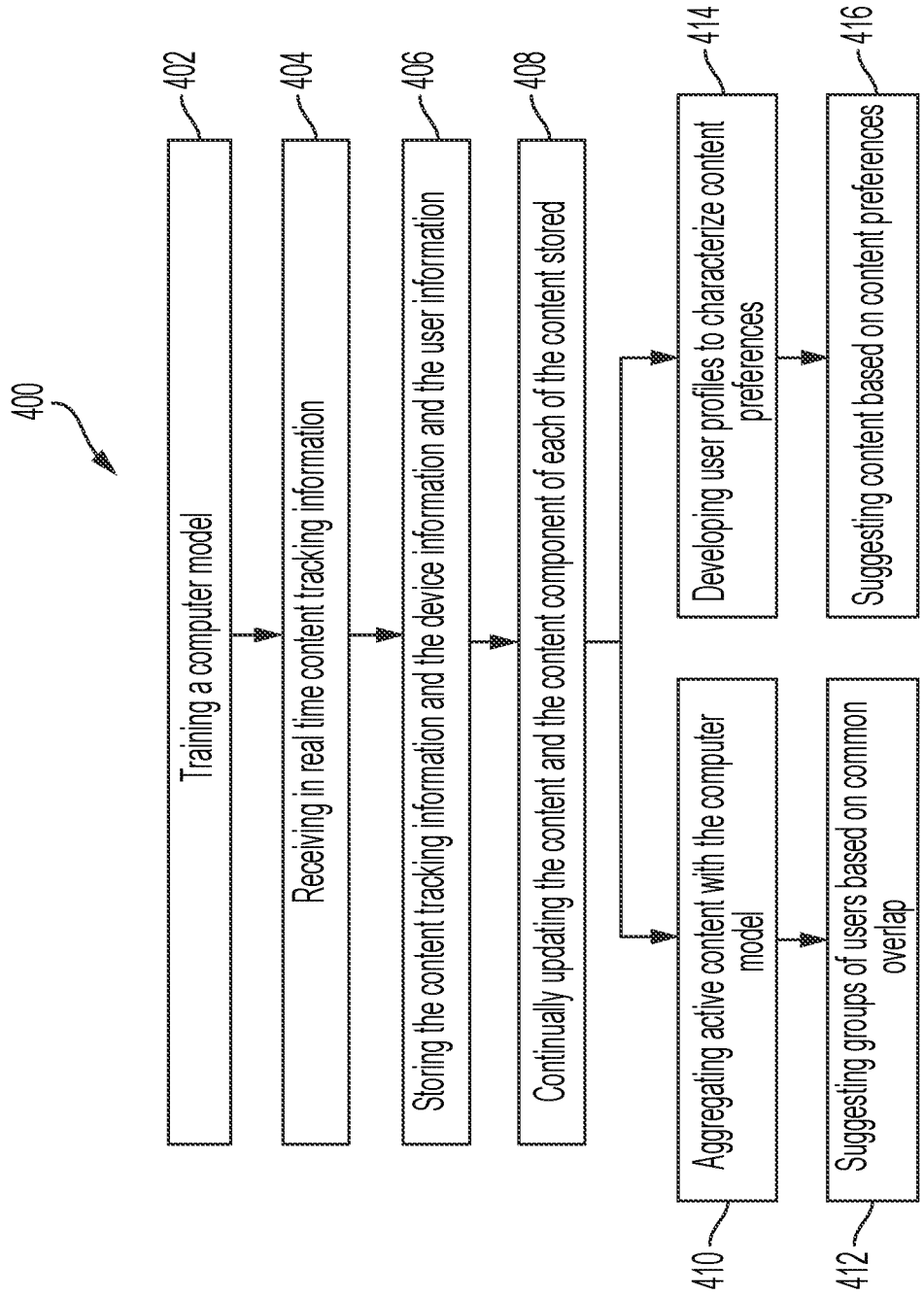
FIG. 7 depicts a method for content or socialization suggestion, in accordance with embodiments of the present invention.

FIG. 7 depicts a method 400 for content or socialization suggestion, in accordance with embodiments of the present invention. The method 400 may include a first step (not shown) of receiving training data by a cognitive engine, machine learning algorithm, module, application or the like. The method 400 includes a next step 402 of training the computer model, using the received training data. The data may include data related to content tracking received by the computer system 120 and/or stored in the data repository 125. The method 400 includes a step 404 of receiving real-time content tracking information, such as by the receiving module 1111 of the computer system 120. The method 400 includes a next step 406 of storing the content tracking information and the device information and the user information of the received content tracking information, for example, into the data repository 125. The method 400 includes a further step 408 of continually updating the content and the content component in real time, as new information is received. The method 400 includes a step 410 of aggregating the active content with the computer model. The step 410 may include determining preferences, by the model, of a user, user device, or user profile, based on the computer model. The method 400 then may include a step 412 of suggesting groups of users based on common overlap of content information between the users. The method 400 may include a step 414 of developing user profiles to characterize content preferences, by the computer model and then a step 416 of suggesting or recommending content based on content preferences.

Figure 8:
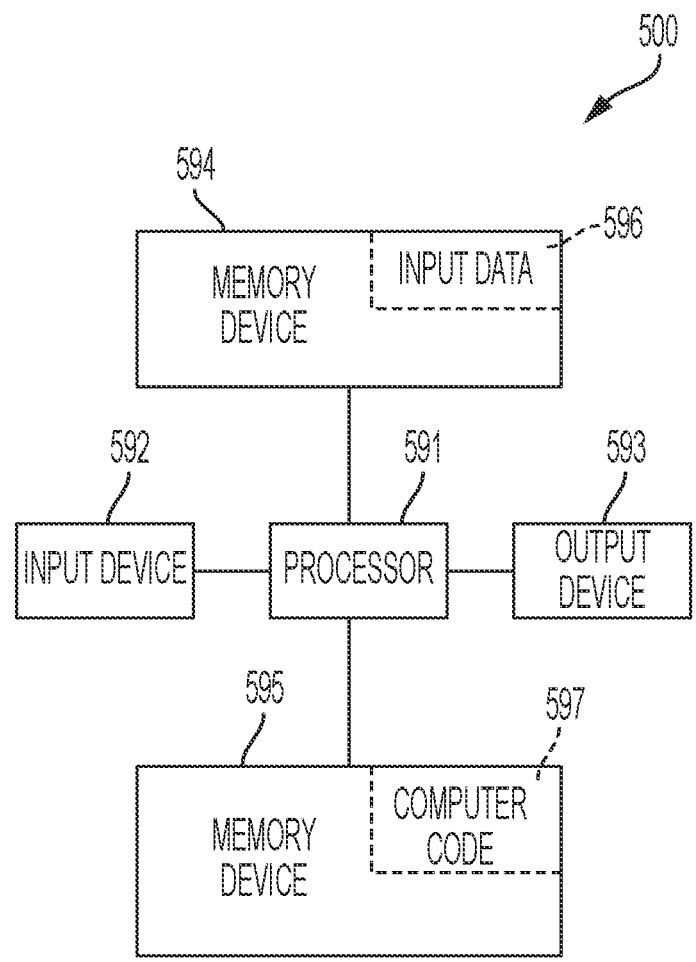
FIG. 8 depicts a block diagram of a computer system for the system of content aggregation of FIGS. 1 and 2, capable of implementing methods such as those of FIGS. 5-7, in accordance with embodiments of the present invention.

FIG. 8 depicts a block diagram of a computer system which represents any computer system shown in the system for content aggregation of FIGS. 1 and 2, capable of implementing methods such as those of FIGS. 5-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing methods for content aggregation, in the manner prescribed by the embodiments of FIGS. 5-7 using the system for content aggregation of FIGS. 1 and 2, wherein the instructions of the computer code 597 may be executed by processor 591 via memory device 595. The computer code 597 may include software or program instructions that may implement one or more algorithms for implementing the methods for transfer learning through composite model slicing, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for content aggregation. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for content aggregation. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for content aggregation. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for content aggregation.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, or Java, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
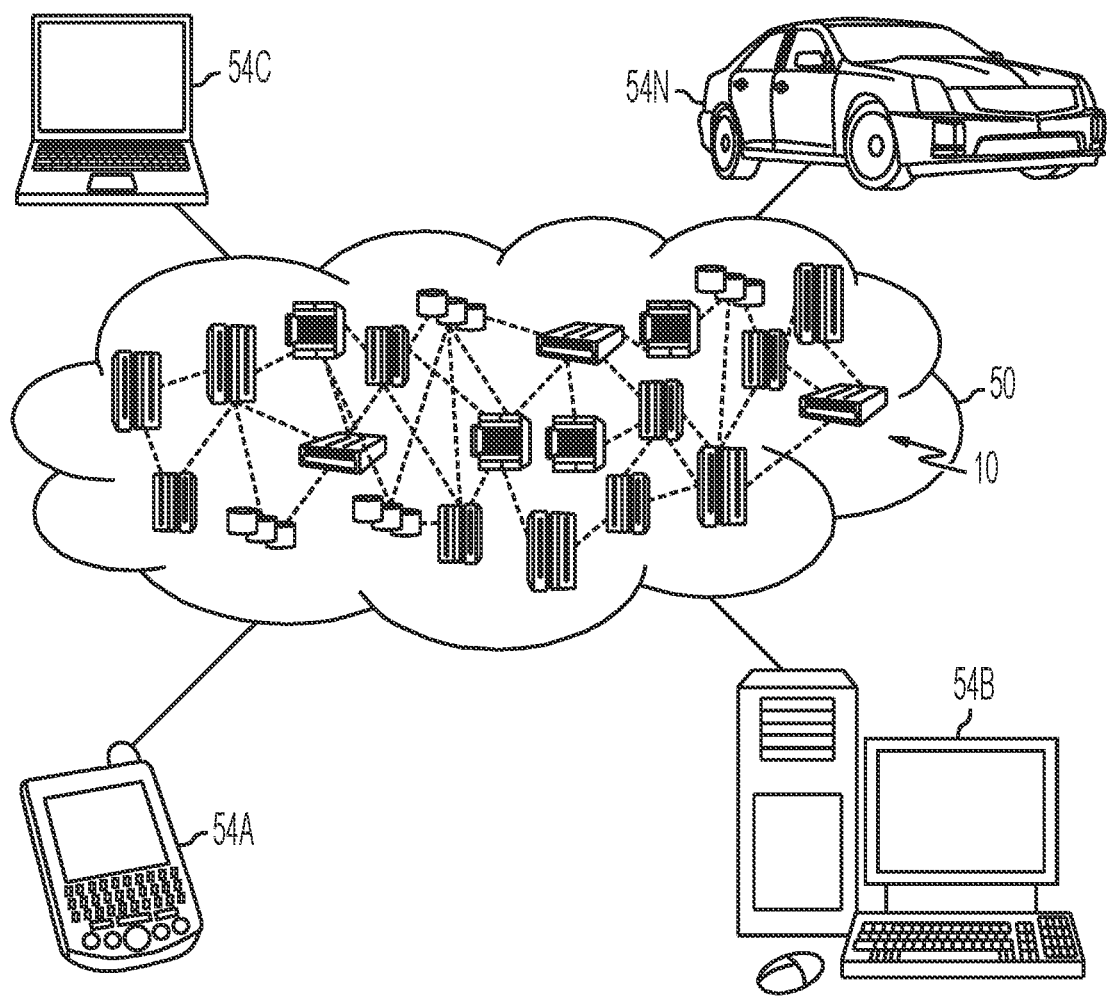
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 10:
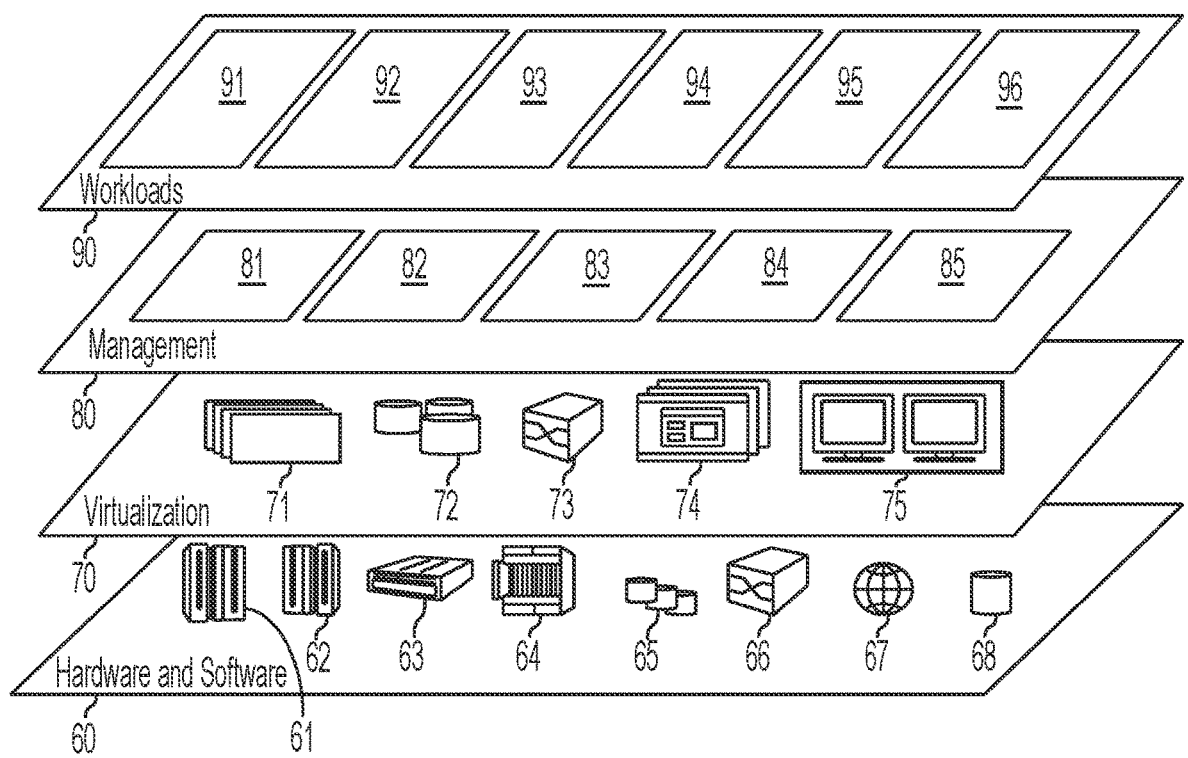
FIG. 10 depicts abstraction model layers, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: sending and receiving 91; tracking 92; aggregating 93; overlapping 94; learning 95; and recommending 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by one or more processors of a computer system, an agreement to opt-in from each of a plurality of electronic device users;

receiving, by the one or more processors of the computer system, device information and user information related to the plurality of electronic device users;

enabling, by the one or more processors of the computer system using an opt-in feature, content tracking of each of the plurality of electronic device users for content viewed, streamed and/or stored by the electronic device users on electronic devices;

receiving, by the one or more processors of the computer system, in real time content tracking information related to the content viewed, streamed and/or stored by the electronic device users on the electronic devices, wherein the content tracking information includes content identification and a content component for each of the content viewed, streamed and/or stored for each of the plurality of electronic device users in real time;

storing, by the one or more processors of the computer system, the content tracking information and the device information and the user information such that the content tracking information is associated with particular device information and particular user information from which the content tracking information was received, wherein the storing includes continually updating the content and the content component for each of the content viewed, streamed and/or stored for each of the plurality of electronic device users in real time;

aggregating, by the one or more processors of the computer system, active content stored during the storing across all of the plurality of electronic device users and determining a degree of user-to-user content overlap from the aggregating;

based on the aggregating, providing, by the one or more processors of the computer system, an application feature to each of the plurality of electronic device users displaying a number and demographics of other active users of the plurality of electronic device users engaged with content that is the same as content engaged by each of the plurality of electronic device users; and providing, by the one or more processors of the computer system, a user of the plurality of electronic device users with contact information to allow communication with one or more of the other active users of the plurality of electronic device users based on a degree of common overlap between the user and the one or more of the other active users with previously viewed content.

2. The method of claim 1, further comprising:

parsing, by the one or more processors of the computer system, group level data of the plurality of electronic device users based on the device information, the user information, and the content tracking information, and wherein the user information includes location and language information.

3. The method of claim 1, further comprising:

using, by the one or more processors of the computer system, machine learning to suggest groups of users of the plurality of electronic device users based at least in part on the degree of common overlap between the user and the one or more of the other active users with the previously viewed content.

4. The method of claim 1, further comprising:

developing, by the one or more processors of the computer system, user profiles of the plurality of electronic device users using machine learning in order to characterize content preferences of the plurality of electronic device users; and using, by the one or more processors of the computer system, the user profiles to suggest for a user of the plurality of electronic device users new content and/or groups of users of the plurality of electronic device users to join.

5. The method of claim 1, further comprising:

providing, by the one or more processors of the computer system, to the user of the plurality of electronic device users, information displaying current active content engagement by others of the plurality of electronic device users; and allowing, by the one or more processors of the computer system, the user of the plurality of electronic device users to directly select new content to engage from the information displaying current active content engagement by others of the plurality of electronic device users.

6. The method of claim 1, further comprising:

providing, by the one or more processors of the computer system, to a content publisher or creator, real time engagement information including the content component for each of the content viewed, streamed and/or stored for each of the plurality of electronic device users in real time.

7. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method for content aggregation, the method comprising:
 receiving, by the one or more processors of the computer system, an agreement to opt-in from each of a plurality of electronic device users;
 receiving, by the one or more processors of the computer system, device information and user information related to the plurality of electronic device users;
 enabling, by the one or more processors of the computer system using an opt-in feature, content tracking of each of the plurality of electronic device users for content viewed, streamed and/or stored by the electronic device users on electronic devices;
 receiving, by the one or more processors of the computer system, in real time content tracking information related to the content viewed, streamed and/or stored by the electronic device users on the electronic devices, wherein the content tracking information includes content identification and a content component for each of the content viewed, streamed and/or stored for each of the plurality of electronic device users in real time;
 storing, by the one or more processors of the computer system, the content tracking information and the device information and the user information such that the content tracking information is associated with particular device information and particular user information from which the content tracking information was received, wherein the storing includes continually updating the content and the content component for each of the content viewed, streamed and/or stored for each of the plurality of electronic device users in real time;
 aggregating, by the one or more processors of the computer system, active content stored during the storing across all of the plurality of electronic device users and determining a degree of user-to-user content overlap from the aggregating;
 based on the aggregating, providing, by the one or more processors of the computer system, an application feature to each of the plurality of electronic device users displaying a number and demographics of other active users of the plurality of electronic device users engaged with content that is the same as content engaged by each of the plurality of electronic device users; and
 providing, by the one or more processors of the computer system, a user of the plurality of electronic device users with contact information to allow communication with one or more of the other active users of the plurality of electronic device users based on a degree of common overlap between the user and the one or more of the other active users with previously viewed content.

8. The computer system of claim 7, the method further comprising:
 parsing, by the one or more processors of the computer system, group level data of the plurality of electronic device users based on the device information, the user information, and the content tracking information, and wherein the user information includes location and language information.

9. The computer system of claim 7, the method further comprising:
 using, by the one or more processors of the computer system, machine learning to suggest groups of users of the plurality of electronic device users based at least in part on the degree of common overlap between the user and the one or more of the other active users with the previously viewed content.

10. The computer system of claim 7, the method further comprising:
 developing, by the one or more processors of the computer system, user profiles of the plurality of electronic device users using machine learning in order to characterize content preferences of the plurality of electronic device users; and
 using, by the one or more processors of the computer system, the user profiles to suggest for a user of the plurality of electronic device users new content and/or groups of users of the plurality of electronic device users to join.

11. The computer system of claim 7, the method further comprising:
 providing, by the one or more processors of the computer system, to the user of the plurality of electronic device users, information displaying current active content engagement by others of the plurality of electronic device users; and
 allowing, by the one or more processors of the computer system, the user of the plurality of electronic device users to directly select new content to engage from the information displaying current active content engagement by others of the plurality of electronic device users.

12. The computer system of claim 7, the method further comprising:
 providing, by the one or more processors of the computer system, to a content publisher or creator, real time engagement information including the content component for each of the content viewed, streamed and/or stored for each of the plurality of electronic device users in real time.

13. A computer program product for content aggregation, the computer program product comprising:
 one or more computer readable storage media having computer readable program code collectively stored on the one or more computer readable storage media, the computer readable program code being executed by one or more processors of a computer system to cause the computer system to perform a method comprising:
  receiving, by the one or more processors of the computer system, an agreement to opt-in from each of a plurality of electronic device users;
  receiving, by the one or more processors of the computer system, device information and user information related to the plurality of electronic device users;
  enabling, by the one or more processors of the computer system using an opt-in feature, content tracking of each of the plurality of electronic device users for content viewed, streamed and/or stored by the electronic device users on electronic devices;
  receiving, by the one or more processors of the computer system, in real time content tracking information related to the content viewed, streamed and/or stored by the electronic device users on the electronic devices, wherein the content tracking information includes content identification and a content component for each of the content viewed, streamed and/or stored for each of the plurality of electronic device users in real time;

storing, by the one or more processors of the computer system, the content tracking information and the device information and the user information such that the content tracking information is associated with particular device information and particular user information from which the content tracking information was received, wherein the storing includes continually updating the content and the content component for each of the content viewed, streamed and/or stored for each of the plurality of electronic device users in real time;

aggregating, by the one or more processors of the computer system, active content stored during the storing across all of the plurality of electronic device users and determining a degree of user-to-user content overlap from the aggregating;

based on the aggregating, providing, by the one or more processors of the computer system, an application feature to each of the plurality of electronic device users displaying a number and demographics of other active users of the plurality of electronic device users engaged with content that is the same as content engaged by each of the plurality of electronic device users; and providing, by the one or more processors of the computer system, a user of the plurality of electronic device users with contact information to allow communication with one or more of the other active users of the plurality of electronic device users based on a degree of common overlap between the user and the one or more of the other active users with previously viewed content.

14. The computer program product of claim 13, the method further comprising:
parsing, by the one or more processors of the computer system, group level data of the plurality of electronic device users based on the device information, the user information, and the content tracking information, and wherein the user information includes location and language information.

15. The computer program product of claim 13, the method further comprising:
using, by the one or more processors of the computer system, machine learning to suggest groups of users of the plurality of electronic device users based at least in part on the degree of common overlap between the user and the one or more of the other active users with the previously viewed content.

16. The computer program product of claim 13, the method further comprising:
developing, by the one or more processors of the computer system, user profiles of the plurality of electronic device users using machine learning in order to characterize content preferences of the plurality of electronic device users; and
using, by the one or more processors of the computer system, the user profiles to suggest for a user of the plurality of electronic device users new content and/or groups of users of the plurality of electronic device users to join.

17. The computer program product of claim 13, the method further comprising:
providing, by the one or more processors of the computer system, to the user of the plurality of electronic device users, information displaying current active content engagement by others of the plurality of electronic device users; and
allowing, by the one or more processors of the computer system, the user of the plurality of electronic device users to directly select new content to engage from the information displaying current active content engagement by others of the plurality of electronic device users.

18. The computer program product of claim 13, the method further comprising:
providing, by the one or more processors of the computer system, to a content publisher or creator, real time engagement information including the content component for each of the content viewed, streamed and/or stored for each of the plurality of electronic device users in real time.

19. A method comprising:
receiving, by one or more processors of a computer system, an agreement to opt-in from each of a plurality of electronic device users;
receiving, by the one or more processors of the computer system, device information and user information related to the plurality of electronic device users;
enabling, by the one or more processors of the computer system using an opt-in feature, content tracking of each of the plurality of electronic device users for content viewed, streamed and/or stored by the electronic device users on electronic devices;
receiving, by the one or more processors of the computer system, in real time content tracking information related to the content viewed, streamed and/or stored by the electronic device users on the electronic devices, wherein the content tracking information includes content identification and a content component for each of the content viewed, streamed and/or stored for each of the plurality of electronic device users in real time;
storing, by the one or more processors of the computer system, the content tracking information and the device information and the user information such that the content tracking information is associated with particular device information and particular user information from which the content tracking information was received, wherein the storing includes continually updating the content and the content component for each of the content viewed, streamed and/or stored for each of the plurality of electronic device users in real time;
parsing, by the one or more processors of the computer system, group level data of the plurality of electronic device users based on the device information, the user information, and the content tracking information, and wherein the user information includes location and language information;
aggregating, by the one or more processors of the computer system, active content stored during the storing across all of the plurality of electronic device users and determining a degree of user-to-user content overlap from the aggregating; and
based on the aggregating and parsing, providing, by the one or more processors of the computer system, an application feature to each of the plurality of electronic device users displaying a number and demographics of other active users of the plurality of electronic device users engaged with content that is the same as content engaged by each of the plurality of electronic device users.

20. A method comprising:

receiving, by one or more processors of a computer system, an agreement to opt-in from each of a plurality of electronic device users;

receiving, by the one or more processors of the computer system, device information and user information related to the plurality of electronic device users;

enabling, by the one or more processors of the computer system using an opt-in feature, content tracking of each of the plurality of electronic device users for content viewed, streamed and/or stored by the electronic device users on electronic devices;

receiving, by the one or more processors of the computer system, in real time content tracking information related to the content viewed, streamed and/or stored by the electronic device users on the electronic devices, wherein the content tracking information includes content identification and a content component for each of the content viewed, streamed and/or stored for each of the plurality of electronic device users in real time;

storing, by the one or more processors of the computer system, the content tracking information and the device information and the user information such that the content tracking information is associated with particular device information and particular user information from which the content tracking information was received, wherein the storing includes continually updating the content and the content component for each of the content viewed, streamed and/or stored for each of the plurality of electronic device users in real time;

aggregating, by the one or more processors of the computer system, active content stored during the storing across all of the plurality of electronic device users and determining a degree of user-to-user content overlap from the aggregating;

based on the aggregating, providing, by the one or more processors of the computer system, an application feature to each of the plurality of electronic device users displaying a number and demographics of other active users of the plurality of electronic device users engaged with content that is the same as content engaged by each of the plurality of electronic device users; and using, by the one or more processors of the computer system, machine learning to suggest groups of users of the plurality of electronic device users based at least in part on a degree of common overlap between the user and the other active users with previously viewed content.

* * * * *